United States Patent
Dollar et al.

(10) Patent No.: US 9,070,045 B2
(45) Date of Patent: Jun. 30, 2015

(54) CROSSTALK CASCADES FOR USE IN OBJECT DETECTION

(71) Applicant: Microsoft Corporation, Redmond, WA (US)

(72) Inventors: Piotr Dollar, Redmond, WA (US); Wolf Kienzle, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 13/716,208

(22) Filed: Dec. 17, 2012

(65) Prior Publication Data

US 2014/0169688 A1    Jun. 19, 2014

(51) Int. Cl.
*G06K 9/00* (2006.01)
*G06K 9/62* (2006.01)

(52) U.S. Cl.
CPC ............ *G06K 9/6257* (2013.01); *G06K 9/6227* (2013.01)

(58) Field of Classification Search
CPC ............ G06K 9/00248; G06K 9/6256; G06K 9/00228; G06K 9/3216; G06K 9/00221; G06K 9/00234; G06K 9/2018; G06K 9/00281; G06K 9/38; G06K 9/6203; G06K 9/6292; G06T 2207/30216; G06T 7/0002
USPC ......... 382/118, 224, 195, 165, 167, 170, 103, 382/181, 190, 225, 228, 282; 348/E5.055, 348/222.1, 240.2; 707/705
See application file for complete search history.

(56) References Cited

U.S. PATENT DOCUMENTS

| | | | | |
|---|---|---|---|---|
| 7,099,510 | B2 * | 8/2006 | Jones et al. | 382/225 |
| 7,366,330 | B2 * | 4/2008 | Ito | 382/118 |
| 7,957,567 | B2 * | 6/2011 | Yamaguchi | 382/118 |
| 8,447,139 | B2 * | 5/2013 | Guan et al. | 382/291 |
| 2011/0255741 | A1 | 10/2011 | Jung et al. | |
| 2011/0255743 | A1 | 10/2011 | Guan et al. | |
| 2012/0170805 | A1 * | 7/2012 | Brown et al. | 382/103 |
| 2012/0219210 | A1 * | 8/2012 | Ding et al. | 382/159 |
| 2014/0133758 | A1 * | 5/2014 | Kienzle | 382/195 |

OTHER PUBLICATIONS

Frome, et al., "Large-scale Privacy Protection in Google Street View", Retrieved at <<http://static.googleusercontent.com/external_content/untrusted_dlcp/research.google.com/en//archive/papers/cbprivacy_iccv09.pdf>>, In the IEEE 12th International Conference on Computer Vision, Sep. 29, 2009, pp. 1-8.

Breitenstein1, et al., "Robust Tracking-by-Detection using a Detector Confidence Particle Filter", Retrieved at <<http://www.mmp.rwth-aachen.de/publications/pdf/breitenstein-detectorconfidencefilter-iccv09.pdf>>, In the proceeding IEEE 12th International Conference on Computer Vision, Sep. 29, 2009, pp. 1-8.

(Continued)

*Primary Examiner* — Sheela Chawan
(74) *Attorney, Agent, or Firm* — Miia Sula; Judy Yee; Micky Minhas

(57) ABSTRACT

Technologies pertaining to object detection are described herein. A cascaded classifier executes over subwindows of an image in a plurality of stages. A crosstalk cascade is employed to reject subwindows as being candidates for including an object that is desirably detected, where the crosstalk cascade is a combination of multiple cascades.

20 Claims, 8 Drawing Sheets

(56) References Cited

OTHER PUBLICATIONS

Wei, et al., "Efficient Histogram-Based Sliding Window", Retrieved at <<http://research.microsoft.com/en-us/people/yichenw/cvpr10_ehsw.pdf>>, In the 2010 IEEE Conference on Computer Vision and Pattern Recognition (CVPR), Jun. 13, 2010, pp. 1-8.

Gould, et al., "Region-based Segmentation and Object Detection", Retrieved at <<http://www.stanford.edu/~tianshig/papers/nips09-sceneObject.pdf>>, In the Twenty-Fourth Annual Conference on Neural Information Processing Systems, Dec. 9, 2009, pp. 1-9.

Felzenszwalb, et al., "Cascade Object Detection with Deformable Part Models", Retrieved at <<http://ieeexplore.ieee.org/stamp/stamp.jsp?tp=arnumber=5539906>>, In IEEE Conference on Computer Vision and Pattern Recognition, Jun. 13, 2010, pp. 1-8.

Pedersoli, et al., "A Coarse-to-Fine Approach for Fast Deformable Object Detection", Retrieved at <<http://eprints.pascal-network.org/archive/00008320/01/pedersoli11.pdf>>, In 24th IEEE Conference on Computer Vision and Pattern Recognition, Jun. 20, 2011, pp. 1-8.

Lampert, et al., "Efficient Subwindow Search: A Branch and Bound Framework for Object Localization", Retrieved at <<http://ieeexplore.ieee.org/stamp/stamp.jsp?tp=&arnumber=5166448>>, In Journal of IEEE Transactions on Pattern Analysis and Machine Intelligence, vol. 31, Issue 12, Dec. 2009, pp. 1-14.

Dollar, et al., "The Fastest Pedestrian Detector in the West", Retrieved at http://www.bmva.org/bmvc/2010/conference/paper68/paper68.pdf>>, In Proceedings of the British Machine Vision Conference, Aug. 31, 2010, pp. 1-11.

Benenson, et al., "Pedestrian Detection at 100 Frames Per Second", Retrieved at <<http://ieeexplore.ieee.org/stamp/stamp.jsp?tp=&arnumber=6248017>>, In IEEE Conference on Computer Vision and Pattern Recognition, Jun. 16, 2012, pp. 1-8.

Dollar, et al., "Pedestrian Detection: An Evaluation of the State of the Art", Retrieved at <<http://ieeexplore.ieee.org/stamp/stamp.jsp?arnumber=05975165>>, In Journal of IEEE Transactions on Pattern Analysis and Machine Intelligence, vol. 34, Issue 4, Apr. 2012, pp. 19.

Viola, et al., "Rapid Object Detection Using a Boosted Cascade of Simple Features", Retrieved at <<http://ieeexplore.ieee.org/stamp/stamp.jsp?tp=&arnumber=990517>>, Proceedings of the IEEE Computer Society Conference on Computer Vision and Pattern Recognition, vol. 1, Dec. 8, 2001, pp. 1-8.

Bourdev, et al., "Robust Object Detection Via Soft Cascade", Retrieved at <<http://ieeexplore.ieee.org/stamp/stamp.jsp?tp=&arnumber=1467448>>, In Proceedings of the IEEE Computer Society Conference on Computer Vision and Pattern Recognition, vol. 2, Jun. 20, 2005, pp. 1-8.

Zhang, et al., "Multiple-Instance Pruning for Learning Efficient Cascade Detectors", Retrieved at <<http://sdpy.googlecode.com/svn/tags/temp/unsorted3/to_delete/tmp/unsorted/to_remove/research/my_papers/tag/phdthesis_1st_submission_in_May/review/survey/cascade/NIPS2007_0575.pdf>>, In Advances in Neural Information Processing Systems, Dec. 3, 2007, pp. 1-8.

Xiao, et al., "Boosting Chain Learning for Object Detection", Retrieved at <<http://ieeexplore.ieee.org/stamp/stamp.jsp?tp=&arnumber=1238417>>, In Proceedings of the Ninth IEEE International Conference on Computer Vision, Oct. 13, 2003, pp. 1-7.

Sochman, et al., "Waldboost—Learning for Time Constrained Sequential Detection", Retrieved at <<http://ieeexplore.ieee.org/stamp/stamp.jsp?tp=&arnumber=1467435>>, In Proceedings of the IEEE Computer Society Conference on Computer Vision and Pattern Recognition, vol. 2, Jun. 20, 2005, pp. 1-7.

Masnadi-Shirazi, et al., "High Detection-Rate Cascades for Real-Time Object Detection", Retrieved at <<http://ieeexplore.ieee.org/stamp/stamp.jsp?tp=&arnumber=4408860>>, In IEEE 11th International Conference on Computer Vision, Oct. 14, 2007, pp. 1-6.

Zhu, et al., "Fast Human Detection Using a Cascade of Histograms of Oriented Gradients", Retrieved at <<http://ieeexplore.ieee.org/stamp/stamp.jsp?tp=&arnumber=1640933>>, In IEEE Computer Society Conference on Computer Vision and Pattern Recognition, vol. 2, Jun. 17, 2006, pp. 1-8.

Butko, et al., "Optimal Scanning for Faster Object Detection", Retrieved at <<http://ieeexplore.ieee.org/stamp/stamp.jsp?tp=&arnumber=5206540>>, In IEEE Conference on Computer Vision and Pattern Recognition, Jun. 20, 2009, pp. 1-8.

Gualdi, et al., "Multi-Stage Sampling with Boosting Cascades for Pedestrian Detection in Images and Videos", Retrieved at <<http://www.cvpapers.com/papers/ECCV2010.pdf>>, In Proceedings of the 11th European Conference on Computer Vision, vol. 6316, Sep. 5, 2010, pp. 1-14.

Gualdi, et al., "A Multi-Stage Pedestrian Detection Using Monolithic Classifiers", Retrieved at <<http://ieeexplore.ieee.org/stamp/stamp.jsp?tp=&arnumber=6027335>>, In 8th IEEE International Conference on Advanced Video and Signal-Based Surveillance, Aug. 30, 2011, pp. 1-6.

Felzenszwalb, et al., "Efficient Matching of Pictorial Structures", Retrieved at <<http://ieeexplore.ieee.org/stamp/stamp.jsp?tp=&arnumber=854739>>, In Proceedings of the IEEE Conference on Computer Vision and Pattern Recognition, vol. 2, Jun. 13, 2000, pp. 8.

Fleuret, et al., "Coarse-to-Fine Face Detection", Retrieved at <<http://citeseerx.ist.psu.edu/viewdoc/download;jsessionid=0A933FD584DE9636190CEF8169557816?doi=10.1.1.169.5548&rep=rep1&type=pdf>>, In International Journal of Computer Vision—Special Issue on Statistical and Computational Theories of Vision, vol. 41, Issue 1-2, Jan. 2001, pp. 23.

Vempati, et al., "Generalized RBF Feature Maps for Efficient Detection", Retrieved at <<http://www.vlfeat.org/~vedaldi/assets/pubs/sreekanth10generalized.pdf>>, In Proceedings of the British Machine Vision Conference, Aug. 31, 2010, pp. 1-11.

Dollar, et al., "Integral Channel Features", Retrieved at <<http://www.loni.ucla.edu/~ztu/publication/dollarBMVC09ChnFtrs_0.pdf>>, In British Machine Vision Conference, Sep. 7, 2009, pp. 1-11.

Friedman, et al., "Additive Logistic Regression: A Statistical View of Boosting", Retrieved at <<http://www.stanford.edu/~hastie/Papers/AdditiveLogisticRegression/alr.pdf>>, The Annual of Statistics, vol. 28, Issue 2, Apr. 2000, pp. 1-38.

Dalal, et al., "Histograms of Oriented Gradients for Human Detection", Retrieved at <<http://ieeexplore.ieee.org/stamp/stamp.jsp?tp=&arnumber=1467360>>, In IEEE Computer Society Conference on Computer Vision and Pattern Recognition, vol. 1, Jun. 25, 2005, pp. 1-8.

Felzenszwalb, et al., "Object Detection with Discriminatively Trained Part Based Models", Retrieved at <<http://citeseerx.ist.psu.edu/viewdoc/download?doi=10.1.1.160.9889&rep=rep1&type=pdf>>, In IEEE Transactions on Pattern Analysis and Machine Intelligence, Jun. 4, 2009, pp. 1-38.

Everingham, et al., "The PASCAL Visual Object Classes (VOC) Challenge", Retrieved at <<http://citeseerx.ist.psu.edu/viewdoc/download?doi=10.1.1.167.6629&rep=rep1&type=pdf>>, In International Journal of Computer Vision, vol. 88, Issue 2, Jun. 2010, pp. 1-36.

* cited by examiner

CROSSTALK CASCADES FOR USE IN OBJECT DETECTION

BACKGROUND

In many scenarios, it is as important to analyze images and perform object detection quickly as it is to perform object detection accurately. A common application where it is desirable to perform object detection both rapidly and accurately is face detection. For instance, many mobile computing devices include cameras, wherein it is desirable to quickly locate faces in frames captured by a camera (e.g., for the purposes of auto-focusing).

Conventional techniques for analyzing images and detecting certain objects therein, however, remain relatively slow. Specifically, detection time for most detection systems is best measured in seconds per frame, rather than frames per second.

Speed at which objects can be detected by in images has been improved in object detection systems through utilization of cascaded detectors/processing. Cascaded detectors refer to a sequence of detectors, wherein accuracy of a detector in the cascaded sequence of detectors increases as position in the sequence advances, while computation time to execute a detector in the cascaded sequence of detectors likewise increases as position in the sequence increases. Accordingly, a first detector in the cascaded sequence of detectors is the fastest and least accurate detector, while the last detector in the sequence is the slowest and most accurate detector. Cascaded processing refers to a similar approach, where processing is undertaken in stages over respective subwindows of an image, and wherein subwindows are rejected as candidates during such stages. Accordingly, a subwindow rejected during a first stage will have a relatively small amount of processing undertaken thereover, while a subwindow rejected during a later stage will have been analyzed with a relatively large amount of processing undertaken thereover.

When performing object detection in an image, it is desirable to minimize an amount of processing required to identify an object, without sacrificing accuracy. Thus, in conventional staged detection systems, a first detector in the cascaded sequence of detectors (or a first process executed over a subwindow in a cascade of processes) is tasked with analyzing each subwindow, rejecting subwindows that certainly do not include the object of interest, and doing so relatively quickly. Subsequently, a second detector in the cascaded sequence of detectors (or a second process in a cascade of processes) is executed over all subwindows not rejected in earlier stages; this process continues until all subwindows in the image have been rejected (and thus, the object does not exist in the image) or until the last detector in the cascaded sequence of detectors (or the last process in the cascade of processes) indicates that one or more subwindows in the image include the object of interest. While the process set forth above has increased speed in which object identification can be undertaken, the process remains relatively slow, due to the large number of subwindows in a given image (e.g., several thousand).

SUMMARY

The following is a brief summary of subject matter that is described in greater detail herein. This summary is not intended to be limiting as to the scope of the claims.

Described herein are various technologies pertaining to detecting specified objects in images. In an example, an object that is desirably detected in images may be a human face or pedestrian, although the technologies described herein are not so limited. Object detection can accomplished relatively quickly through employment of crosstalk cascades, which refers to a combination of and communication between a plurality of object detection cascades. A cascade, as the term is used herein, generally refers to the employment of cascaded processing over subwindows of an image over several stages of a multi-stage object detection approach. The cascaded processing is undertaken to iteratively reduce candidate subwindows in an image, wherein a candidate subwindow is a subwindow that may include an object desirably detected. A crosstalk cascade includes an excitatory cascade, a soft cascade, and an inhibitory cascade.

In operation, an image is received and a plurality of subwindows of the image are defined, wherein subwindows may overlap, may be of varying sizes, and may be of varying shapes. Accordingly, a single image may include tens of thousands, hundreds of thousands, or even millions of subwindows. Features of the image for each subwindow may then be extracted utilizing a relatively lightweight feature extraction algorithm, wherein such features of respective subwindows are analyzed iteratively during cascaded processing of the subwindow in connection with ascertain whether the subwindow can be rejected as a candidate.

In an excitatory cascade, at a first stage of the object detection process, first processing can be undertaken over a sampled (sparse) set of subwindows (e.g., one of every X subwindows can be selected). In an exemplary embodiment, each stage of the object detection process can use a detector that is independent of detectors utilized in previous stages of the object detection process. In another embodiment, a boosted classifier that comprises K weak classifiers can be employed, wherein a kth stage of the object detection process corresponds to aggregated output of k weak classifiers. Other embodiments are also contemplated. Thus, cascaded processing can refer to any form of progressive processing that may be undertaken over a subwindow. If a score assigned to a subwindow from the sampled set from the first processing is below a excitatory cascade threshold score for the first stage, then the subwindow and other subwindows in a predefined neighborhood of the subwindow (e.g., 7 pixels in an X direction, 7 pixels in a Y direction, and 4 pixels in scale) are rejected. Thus, for example, several subwindows can be rejected as candidate subwindows based upon a score assigned to a single subwindow.

Thereafter, in a soft cascade, the first processing can be executed over subwindows identified as candidates from the excitatory cascade (excluding, optionally, subwindows over which the first processing has been undertaken in the excitatory cascade to reduce computation). For each subwindow, its respective score is compared with a pre-defined soft cascade threshold score for the first stage, and if a score is below the threshold, then the subwindow is rejected (resulting in a reduction in candidate subwindows).

Subsequently, in an inhibitory cascade, for each remaining candidate subwindow (every subwindow not rejected during the excitatory cascade or the soft cascade in the first stage), its score is compared with scores assigned to candidate subwindows in a predefined neighborhood of the subwindow. If the ratio of the score of the subwindow to a score of any of the subwindows in the predefined neighborhood is below an inhibitory cascade threshold for the first stage, then the subwindow is rejected. Thus, if the neighbor is getting a much higher response as including the object that is desirably detected, then further processing on the subwindow is not necessary.

As noted above, a crosstalk cascade is the combination of excitatory, soft, and inhibitory cascades, wherein the output of at least one of such cascades is dependent upon the output of another one of the cascades in each stage of a multi-stage object detection process. After the first stage of the detection process is completed, the second stage is commenced and the next processing (e.g., the next detector in the cascaded sequence of detectors or the next classifier in the k weak classifiers) is selected. The second processing is then undertaken over remaining candidate subwindows in the manner described above (excitatory cascade, soft cascade, and inhibitory cascade are executed at each stage with different thresholds, depending on the stage). The employment of these cascades, in the manner set forth above, greatly increases computational efficiency such that object detection can be undertaken quickly and accurately.

Other aspects will be appreciated upon reading and understanding the attached figures and description.

DETAILED DESCRIPTION

Figure 1:
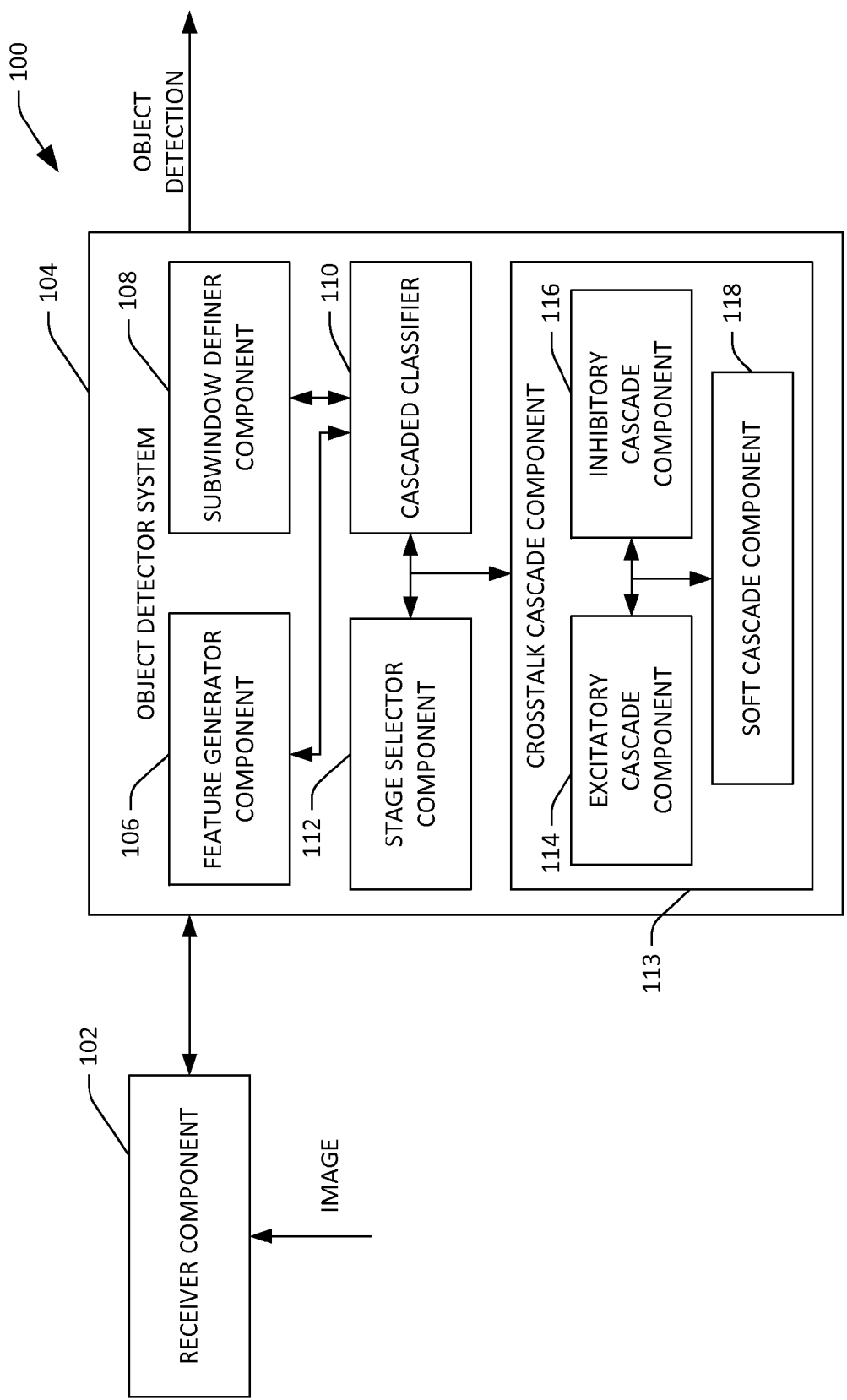
FIG. 1 is a functional block diagram of an exemplary system that facilitates detecting an object in an image.

Various technologies pertaining to object detection will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary system 100 that facilitates detecting an object in an image or images is illustrated. In an exemplary embodiment, the system 100 can be employed in connection with detecting faces or pedestrians in images. Accordingly, for example, the system 100 can be employed in a real-time security application. In other embodiments, the system 100 may be employed in an automotive application where it is desirable to detect people, animals, or other objects in a field of view of a camera coupled to the automobile. In still yet another example, the system 100 may be employed in a robotic device, wherein the robotic device interacts with a particular environment that includes a certain object. With respect to face or pedestrian recognition, the system 100 may be included in a camera or a mobile computing device. Furthermore, the system 100 may be employed in an online social networking application, in an augmented reality application, or any other suitable application where it is desirable to detect objects in images relatively quickly.

The system 100 includes a receiver component 102 that receives an image, wherein the image may be a digital image received from a camera, a digital image received from a data repository that comprises images, etc. The system 100 further comprises an object detector system 104 that is in communication with the receiver component 102. The object detector system 104 is configured to relatively quickly detect a specified object, such as a face or pedestrian, in the image received by the image receiver component 102. As will be described in greater detail below, the object detector system 104 employs a crosstalk cascade, which itself includes plurality of different types of cascades, in connection with detecting the object in the image.

The object detector system 104 includes a feature generator component 106 that receives the image and extracts a plurality of features therefrom. In an exemplary embodiment, the feature generator component 106 can comprise a relatively lightweight algorithm that quickly extracts features from the image that can be used to detect the object of interest. The particular features that can be employed will depend upon the object that is desirably detected, and can be learned at a pre-processing stage.

The object detector system 104 additionally comprises a subwindow definer component 108 that defines numerous subwindows in the image, such that the features extracted by the feature generator component 106 are associated with subwindows defined by the subwindow definer component 108. The subwindow definer component 108 can define subwindows of the image as being of different shapes, sizes, overlapping, etc. Accordingly, the image may include several thousand subwindows, tens of thousands of subwindows, hundreds of thousands of subwindows, millions of subwindows, and so on.

The object detector system 104 additionally comprises a cascaded classifier 110, which is configured to generate scores for subwindows of images that are indicative of likelihood/probability of presence of the object in the respective subwindows in multiple stages of an image detection process. While the cascaded classifier 110 will be described below as a classifier that comprises multiple, weak classifiers, it is to be understood that other embodiments are contemplated. For example, the cascaded classifier 110 can comprise a plurality of independent classifiers that are arranged in a sequence, the classifiers becoming increasingly accurate (and computationally expensive) as the sequence progresses.

In an exemplary embodiment, the cascaded classifier 110 may be a boosted classifier H that comprises K weak classifiers and has the following form:

$$H(x)=H_K(x)=\Sigma_{i=1}^{K}\alpha_i h_i(x), \quad (1)$$

where each $h_i$ is a weak classifier (with output −1 or 1), $\alpha_i$ is its associated weights, and x is a subwindow of the image being analyzed by the cascaded classifier 110. x can be classified as positive (as being a candidate for including the object in the image) if H(x)>0 and H(x) serves as the confidence. Accordingly, a sequence of score functions $H_k(x)$ can be defined for k<K in an analogous manner.

The object detector system 104 further comprises a stage selector component 112 that increments/selects a stage (i) corresponding to the cascaded detector. In an example, a first stage selected by the stage selector component 112 is associated with a first weak classifier of the cascaded classifier 110, which performs a relatively small amount of processing on any given subwindow (with a relatively low level of accuracy). A later stage in the multi-stage object detection process aggregates output of previous stages and executes causes a next week classifier in the cascaded classifier 110 to be executed (and the output aggregated with output of previous stages), thereby involving further computation/processing but a higher level of certainty with respect to the output. Initially, the stage selector component 112 selects the first stage, and thus the first, baseline weak classifier, such that the first, baseline weak classifier of the cascaded detector 110 initially is executed over subwindows of the image defined by the subwindow definer component 108.

The object detector system 104 further comprises a crosstalk cascade component 113, which utilizes multiple cascades, at least some of which are in communication with one another, to reduce a number of candidate subwindows (subwindows that are candidates as including the object that is desirably detected) over stages of the multi-stage detection process. The crosstalk cascade component 113 comprises an excitatory cascade component 114, a soft cascade component 116 (also known as a rejection cascade), and an inhibitory cascade component 118, at each stage of the multi-stage detection process to reduce candidate subwindows. Operation of the crosstalk cascade component 113 is now provided.

Initially, at the first stage, the first weak classifier of the cascaded classifier 110 is executed over a (sparsely) sampled set of subwindows of the image received by the receiver component 102. For instance, the first weak classifier can be executed over one of every set number (such as nine) of subwindows in the image. The first weak classifier $h_1(x)$ is executed over the sampled subwindows, and the first weak classifier outputs a score for each subwindow in the sampled subwindows. If the score for a subwindow output by the first weak classifier is below a predefined excitatory cascade threshold score for the first stage, then the subwindow and all subwindows in a predefined neighborhood of the subwindow are rejected by the excitatory cascade component 114. Otherwise, the subwindow in the sampled subwindows and its neighbors are identified as being candidate subwindows, and are retained for further processing. In an exemplary embodiment, the neighborhood may be seven pixels in the X direction, seven pixels in the Y direction, and three pixels in scale, and the step size may be three pixels by three pixels by one pixel. It is to be understood that the size of the neighborhood may depend upon the object that is desirably detected, and can be selected/tuned.

Still referring to the first stage, the first weak classifier can be utilized to generate a score for each candidate subwindow (subwindows not rejected by the excitatory cascade component 114). To reduce computation, scores for subwindows in the sampled set can be cached by the excitatory cascade component 114, such that recomputation of such scores is unnecessary. The soft cascade analyzer component 116 can compare the scores to a predefined soft cascade threshold score for the first stage, and can reject subwindows that respectively have scores below the predefined soft cascade threshold score.

The object detector system 104 also comprises an inhibitory cascade component 118. The inhibitory cascade component 118 compares, for each subwindow, the score assigned to a respective subwindow with scores assigned to all candidate subwindows in the predefined neighborhood of the subwindow. Specifically, in an exemplary embodiment, the inhibitory cascade component 118 can compute a ratio between the score of the subwindow and the score of the subwindow in its predefined neighborhood, and can reject the subwindow if the ratio is below a predefined inhibitory cascade threshold for the first stage. In other words, based upon the ratio, the inhibitory cascade component 118 can determine that a subwindow in the neighborhood of the subwindow being analyzed is much more likely to include the object desirably detected than the subwindow.

After the first stage has been completed, the stage selector component 112 selects the second stage, such that the second weak classifier in the cascaded classifier 110 executes over remaining candidate subwindows (subwindows not rejected in the first stage). The excitatory cascade component 114, the soft cascade component 116, and the inhibitory cascade component 118 perform the actions described above at the second stage (using thresholds for the second stage), and at each subsequent stage, until there are no remaining candidates (the object does not exist in the image) or until all weak classifiers of the cascaded classifier 110 have executed, in which case remaining candidate subwindows can be identified as including the object.

Additional details pertaining to the excitatory cascade component 114, the soft cascade component 116, and the inhibitory cascade component 118 are now provided. As noted above, the excitatory cascade component 114 executes an excitatory cascade at each stage of a multi-stage object detection process. The goal of an excitatory cascade is to generate a set of candidate subwindows $X_c$ that comprise all quasi-positive subwindows. $X_g$ can denote the samples set of all subwindows x not rejected in previous stages, wherein, in an exemplary embodiment, the sampling is undertaken with a step size half the defined size of a neighborhood $\mathcal{N}$. For instance, if $\mathcal{N} = 7 \times 7 \times 3$, the step size is (3, 3, 1), meaning that one in nine x is in $X_g$. At each stage k, initially $X_c = 0$. For each $x \in X_g$, and for each stage $k \leq k^*$, a determination is made regarding $H_k(x) > \theta_k^E$, where $\theta_k^E$ is the excitation cascade threshold for stage k. k* is the maximum stage where the excitation component 114 is to execute; in stages above k*, the excitation component 114 is idle. If $H_k(x) > \theta_k^E$, then x and all subwindows in the neighborhood of x (all $x' \in \mathcal{N}(x)$) are added to the set of candidate subwindows $X_c$.

Again at each stage, the soft cascade component 116 can receive $X_c$ from the excitatory cascade component 114. For each x in $X_c$, $H_k(x)$ can be computed. It is to be ascertained that $H_k(x)$ previously computed in stage k for the excitatory cascade component 114 can be cached to avoid recomputation. $H_k(x)$ is then compared with a soft cascade threshold for stage k, $\theta_k^R$. If the soft cascade component determines that $H_k(x) < \theta_k^R$, then x is rejected as a candidate (e.g., x is removed from $X_c$).

The inhibitory cascade component 118, at each stage, can receive $X_c$ from the soft cascade component 116, and can compute the ratio of the score of x with respective scores assigned to subwindows x' in the neighborhood of x. Formally, the inhibitory cascade component 118 can, for each subwindow x in $X_c$, compute the ratio $H_k(x)/H_k(x')$, for $x' \in \mathcal{N}(x)$ in $X_c$, and can compare such ratio with an inhibitory cascade threshold $\theta_k^I$ for stage k. If $$\frac{H_k(x)}{H_k(x')} < \theta_k^I,$$

then x is removed from $X_c$. Subsequently, if $X_c$ is not empty, and stage k is not the last stage in the multi-stage process, the stage selector component 112 increments the stage. The excitatory cascade component 114 is provided with $X_c$, samples from $X_c$, and generates an updated $X_c$ based upon the next weak classifier. If stage k is the last stage, and $X_c$ is not empty, x in $X_c$ are output as subwindows that include the object of interest. If $X_c$ is empty, regardless of whether stage k is the last stage, then the crosstalk cascade component 113 can output an indication that the object does not exist in the image.

While the soft cascade component 116 is described as receiving input from the excitatory cascade component 114 and providing output to the inhibitory cascade component 118, it is to be understood that the inhibitory cascade component 118 can receive input from the excitatory cascade component 114, and can provide its output to the soft cascade component 116.

In summary, the crosstalk cascade component 113 combines the excitatory cascade component 114, the soft cascade component 116, and the inhibitory cascade component 118. The excitatory cascade component 114 generally reduces computation for small k, the inhibitory cascade component 118 reduces computation for large k, and the soft cascade component 116 reduces computation across all k. Combining the excitatory cascade component 114 with the inhibitory cascade component 118 includes provision of the sparse set of candidates $X_c$ from the excitatory cascade component 114 as input to the inhibitory cascade component 118 (or the soft cascade component 116).

Figure 2:
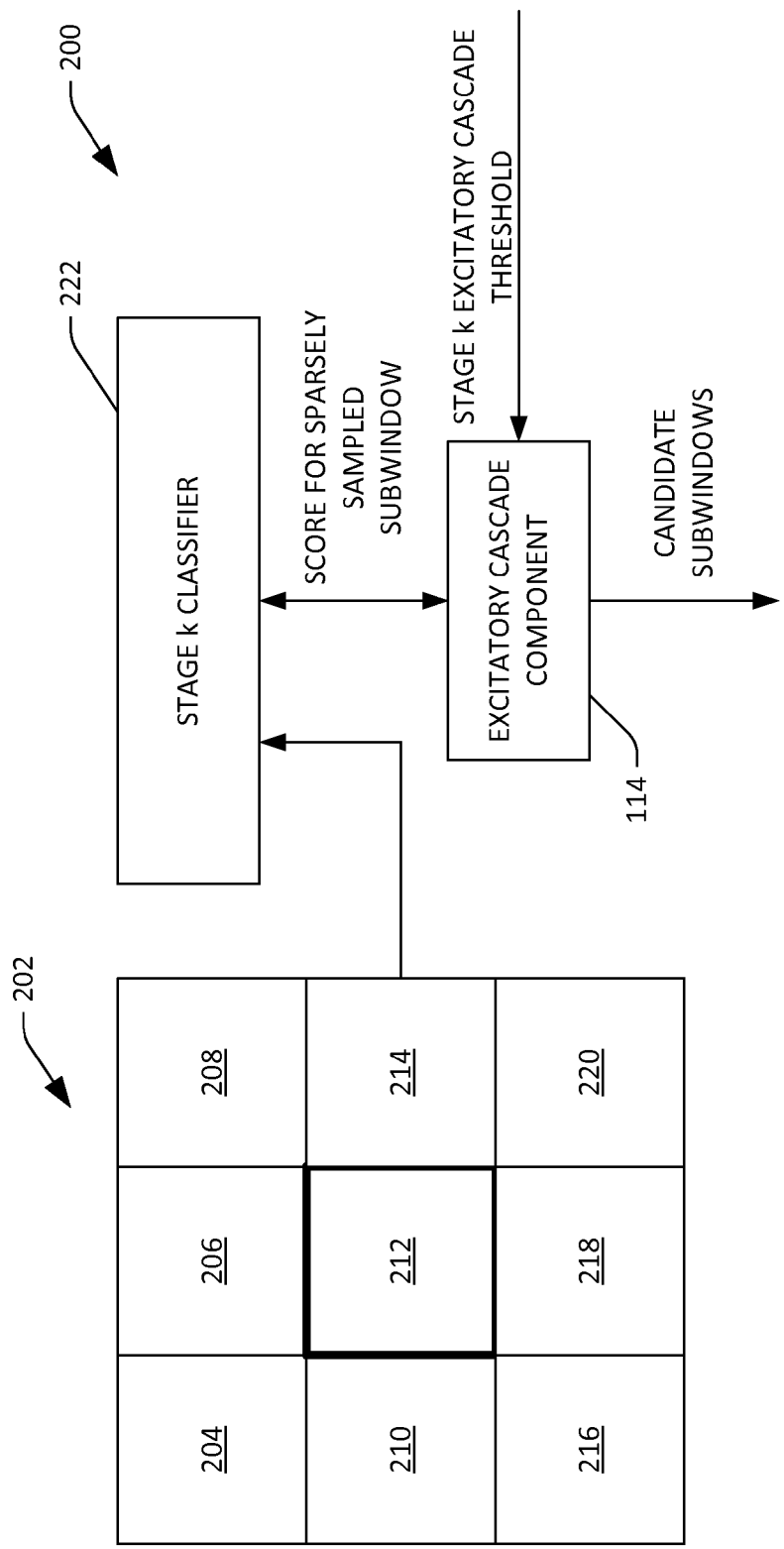
FIG. 2 illustrates exemplary execution of an excitatory cascade at stage k of a multi-stage object detection process.

With reference now to FIG. 2, an exemplary depiction 200 of execution of the excitatory cascade component 114 at stage k of a multi-stage object detection process is illustrated. An exemplary portion 202 of an image comprises nine subwindows 204-220. During an excitatory cascade executed by the excitatory cascade component 114, a sparse set of the subwindows 204-220 is sampled. For example, the subwindow 212 can be sampled from the subwindows 204 through 220. A stage k classifier 222 executes over the sampled subwindow 212 to generate a score for such sampled subwindow 212. The excitatory cascade component 114 receives the score for the sparsely sampled subwindow 212 and compares the score with the excitatory cascade threshold for stage k. As noted above, if the excitatory cascade component 114 determines that the score for the sampled subwindow 212 is above the threshold, then all of the subwindows 204-220 can be retained as candidates for including the object that is desirably detected in the image. If, however, the score for the sampled subwindow 212 is below the stage k excitatory cascade threshold, then the excitatory cascade component 114 can reject all of the subwindows 204-220 (which, in this example, are defined as being in the neighborhood of the sampled subwindow 212). As noted above, this analysis can be undertaken during each stage of the multi-stage object detection process.

Figure 3:
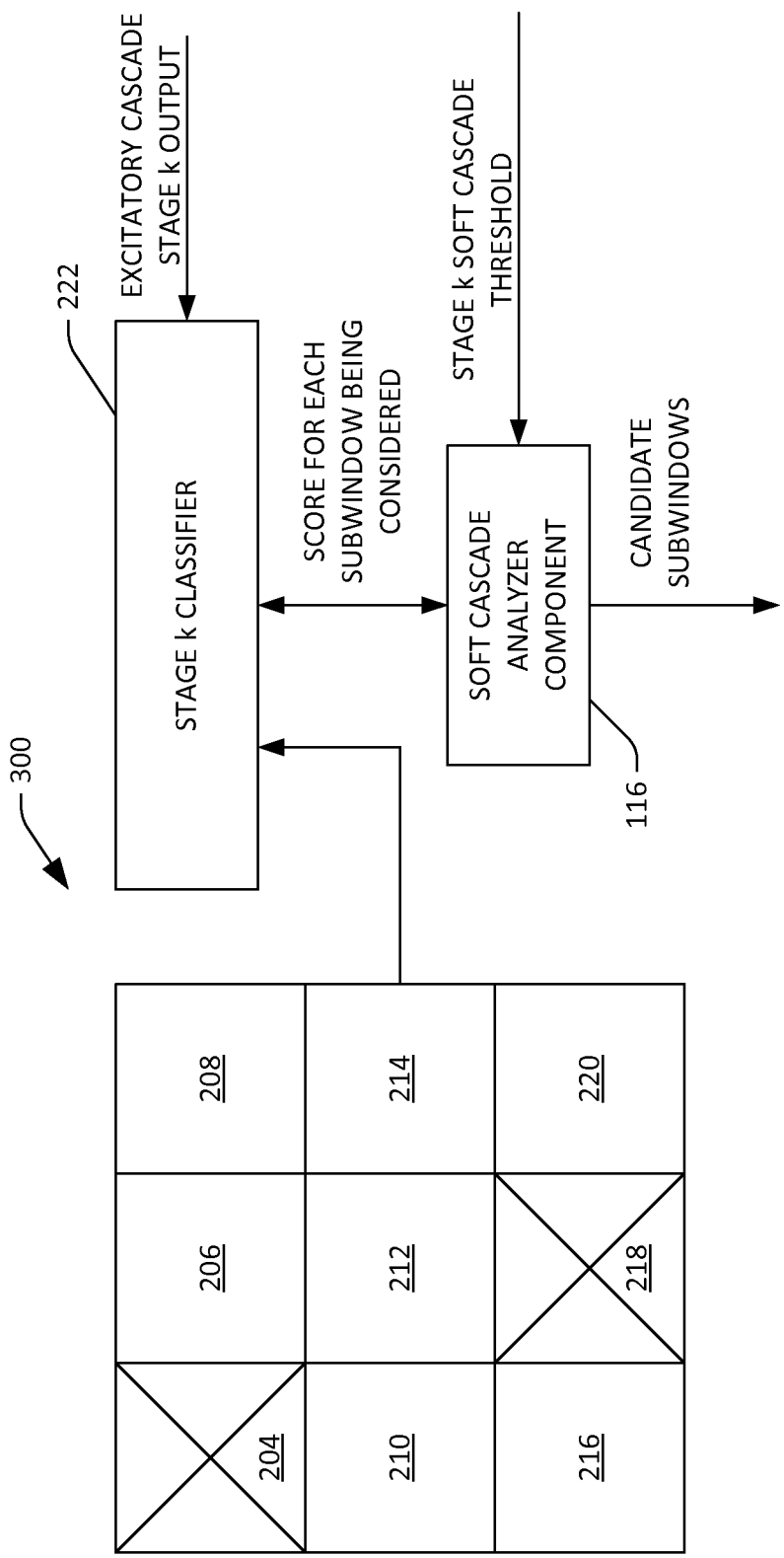
FIG. 3 illustrates exemplary execution of a soft cascade at stage k of a multi-stage object detection process.

Now referring to FIG. 3, an exemplary depiction 300 of execution of the soft cascade component 116 at stage k of the multi-stage detection process is illustrated. In the excitatory cascade, the stage k classifier 222 only executed over the sampled subwindow 212. In an example, the excitatory cascade component 114 may have ascertained that the score for the sampled subwindow 212 is above the excitatory cascade threshold for stage k. Accordingly, the stage k classifier 222 can then execute over all of the subwindows 204-222 in the portion 202 of the image, thereby outputting scores for each of the subwindows 204-220.

The soft cascade component 116 can compare each score for the subwindows 204-220 with the soft cascade threshold for stage k. For each subwindow where the score falls below the aforementioned threshold, the soft cascade component 116 can reject such subwindow, and remove the subwindow from the set of candidate subwindows. Here, for example, the soft cascade component 116 can remove subwindows 204 and 218 from the set of candidate subwindows, as their scores are below the threshold.

Figure 4:
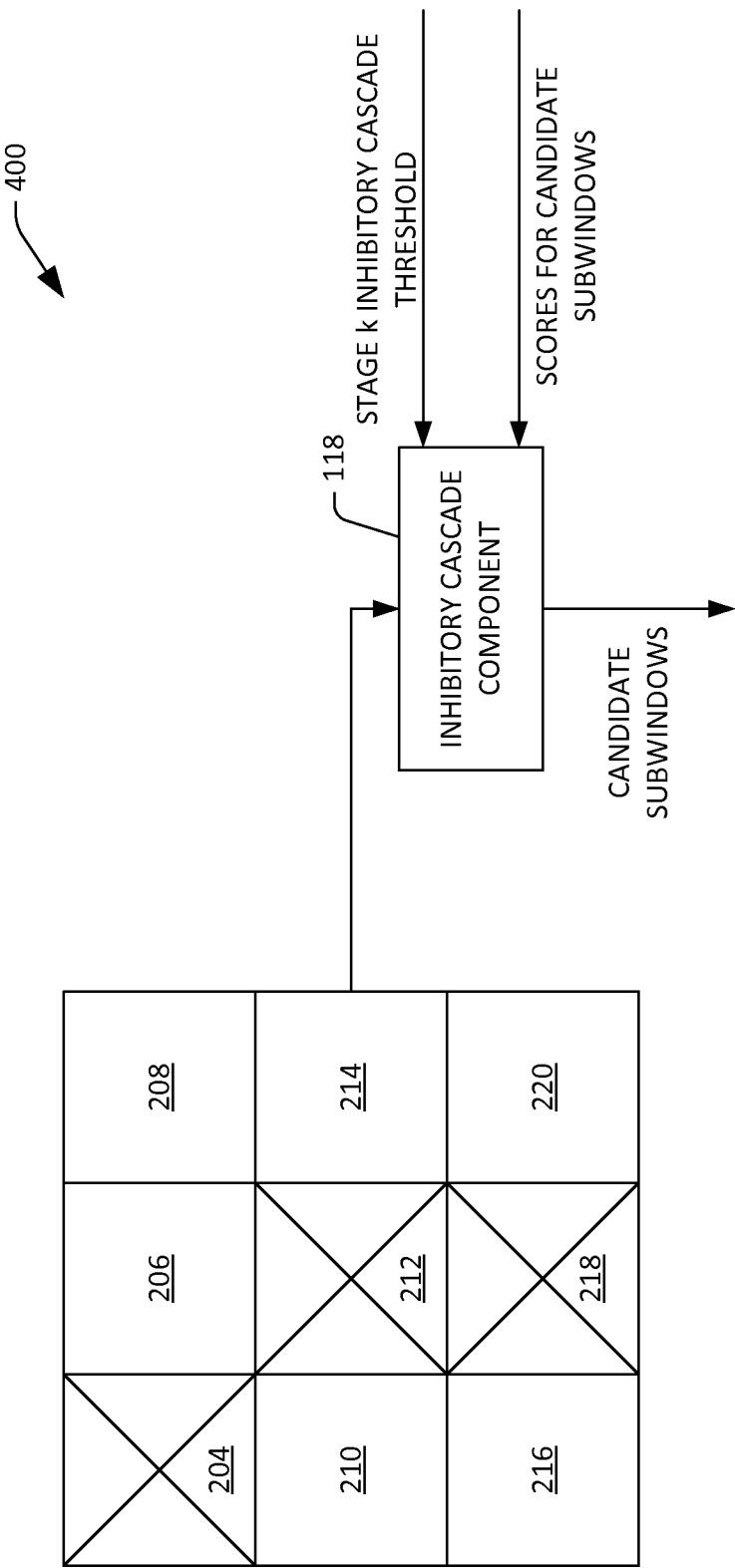
FIG. 4 illustrates exemplary execution of an inhibitory cascade at stage k of a multi-stage object detection process.

Turning now to FIG. 4, an exemplary depiction 400 of execution of the inhibitory cascade component 118 at stage k of the multi-stage detection process is illustrated. The inhibitory cascade component 118 receives the scores for subwindows in the set of candidate subwindows (subwindows not previously rejected in an earlier stage or in stage k by the excitatory cascade component 114 or the soft cascade component 116). For each subwindow, the inhibitory cascade component 118 compares its score with scores of subwindows in the predefined neighborhood of the subwindow. If a ratio of the score of the subwindow to its neighbor is below the predefined inhibitory cascade threshold for stage k, then it is likely that the object that is desirably detected is centered in the neighbor subwindow rather than the subwindow being considered. In the example shown here, the inhibitory cascade component 116 can compare the score assigned to the subwindow 212 with scores assigned to the subwindows 206, 208, 210, 214, 216, and 220. If the ratio of the score assigned to the subwindow 212 with any one of the scores assigned to the aforementioned subwindows is below the predefined inhibitory cascade threshold for stage k, than the subwindow 212 is removed from the candidate set of subwindows. As shown in FIG. 4, the subwindow 212 has been rejected. Subsequently, a next stage of the object detection process can be initiated, and a next weak classifier in the cascaded classifier 110 can be selected.

Figure 5:
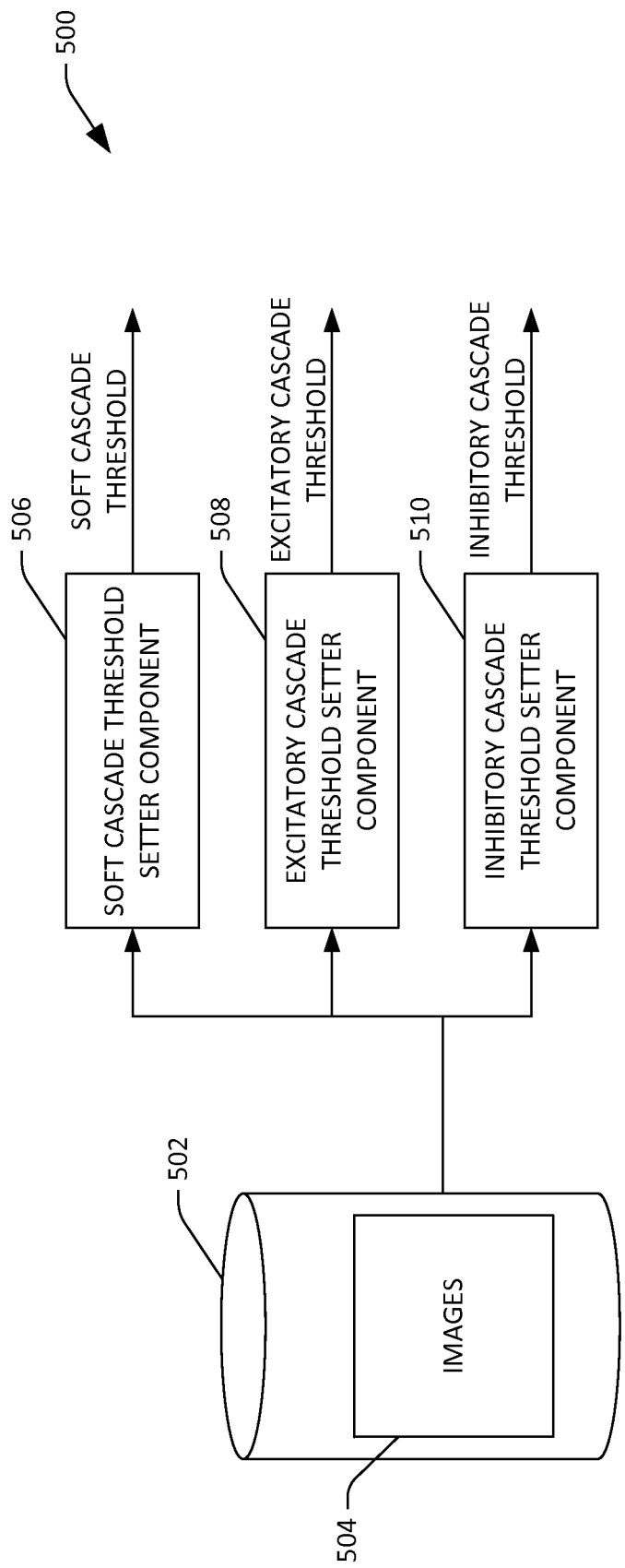
FIG. 5 illustrates an exemplary system that facilitates learning thresholds to be used in connection with an excitatory cascade, a soft cascade, and an inhibitory cascade.

With reference now to FIG. 5, an exemplary system 500 that facilitates determining and setting excitatory cascade thresholds, soft cascade thresholds, and inhibitory cascade thresholds for each stage in a k stage object detection process is illustrated. The system 500 includes a data store 502 that comprises a plurality of images 504. In an exemplary embodiment, the plurality of images 504 can be labeled to identify where in the images the object of interest exists.

The system 500 comprises a soft cascade threshold setter component 506 that sets soft cascade thresholds for each stage of the multi-stage object detection process. An exemplary technique that can be undertaken by the soft cascade threshold setter component 506 is described below; it is to be understood, however, that other techniques are contemplated and are intended to fall under the scope of the hereto-appended claims. The soft cascade threshold setter component 506 can employ an unsupervised approach in connection with learning $\theta_k^R$, based upon the cascaded classifier 110 H, quasi-positives $x_i$, and a target quasi miss rate (QMR) $\gamma$, which is the fraction of quasi-positives with $H_k(x)>\theta^*$ rejected by a cascade, where $\theta^*$ is less than or equal to zero (e.g., $\theta^*=-1$).

First, $\gamma'=1-(1-\gamma)^{1/K}$. If at each stage k the QMR is $\leq \gamma'$, the overall QMR of the soft cascade with be $\leq \gamma$. $X_1$ can denote the set of quasi-positives, and $\mathcal{H}_1=\{H_1(x_i)|x_i \in X_1\}$. The rejection threshold for the first stage can be set as follows:

$$\theta_1^R=[\mathcal{H}_1]_r-\epsilon, \text{ where } r=\gamma' \cdot |\mathcal{H}_1| \qquad (2)$$

Here $[\mathcal{H}]_r$ denotes the $r^{th}$ order statistic of $\mathcal{H}$ (e.g., the $r^{th}$ smallest value in $\mathcal{H}$), and $\epsilon=10^{-5}$. For each remaining stage $1<k<K$, $X_k=\{x_i \in X_{k-1}|H_{k-1}(x_i)>\theta_{k-1}^R\}$ and $\mathcal{H}_k=\{H_k(x_i)|x_i \in X_k\}$, and the following can be computed as the soft cascade threshold for stage k:

$$\theta_k^R=\lfloor \mathcal{H}_k \rfloor_r -\epsilon, \text{ where } r=\lfloor\gamma'\cdot|\mathcal{H}_k|\rfloor \quad (3)$$

When the soft cascade component 116 is configured with the soft cascade threshold for stages of the multi-stage process, the QMR is at most $\gamma$. $\theta_k^R$ can be further optimized by performing a second pass with a target QMR $\gamma=0$ and $X_{K+1}$ as the initial set of quasi-positives.

The system 500 additionally comprises an excitatory cascade threshold setter component 508 that sets excitatory cascade thresholds for respective stages of the multi-stage object detection process. The excitatory cascade threshold setter component 508 learns such thresholds, in an exemplary embodiment, in an unsupervised manner. Additionally, the maximum excitation stage k* can be learned in an unsupervised manner. The thresholds $\theta_k^E$ and the maximum excitation stage k* can be learned given H, $x_i$, and target QMR $\gamma$. For purposes of explanation, only the two-dimensional case (single scale) is described, and $\theta_k^E$ is initially learned for a single excitation stage k*=k. $X_g^o$ denotes a sampling grid offset by o relative to $x_i$. Given a step size ($s_x,s_y$), there are $s_x s_y$ possible offsets o for $X_g^o$ (including one case where $x_i \in X_g^o$). Every sampling grid $X_g^o$ can be treated as a separate, equally likely possibility.

$h_i^o$ can be the maximum score $H_k(x'_i)$ of all the $x'_i \in \mathcal{N}(x_i) \cap X_g^o$. In an exemplary embodiment, as noted above, the step size can be half the size of $\mathcal{N}$, such that, for example, at least n≥4 neighbors of $x_i$ will be in $X_g^o$ regardless of the offset o; however, the number of neighbors of $x_i$ may be fewer. Subsequently, if all the $x'_i \in \mathcal{N}(x_i) \cap X_g^o$ were rejected by the soft cascade, then $h_i^o=-\infty$, otherwise $h_i^o=\max(H_k(x'_i))$. Then, the following can be computed:

$$\theta_k^E=\lfloor \mathcal{H}_k \rfloor_r -\epsilon, \text{ where } r=\lfloor\gamma'\cdot|\mathcal{H}_k|\rfloor \text{ and } \mathcal{H}_k=\{h_i^o\}. \quad (4)$$

If $\theta_k^E \neq -\infty$, then by construction on average $1-\gamma$ quasi-positives will end up on $X_c$. Unfortunately, $\theta_k^E=-\infty$ implies that no such threshold exists. The above procedure fails if the excitation stage is too late. It can be recognized that a region of support (ROS) of the cascaded classifier 110 decreased with increasing k while its discriminative power increases. This causes a tension between performing excitation early, when discriminability is low, and performing excitation late when the ROS is small. Accordingly, the last valid excitation can be identified by starting with k=K and working backwards until $\theta_k^E$ valid. Finally, $\theta_k^E$, for earlier stages, can be set to the smallest value such that $|X_c|$ does not increase.

The system 500 further comprises an inhibitory cascade threshold setter component 510 that sets thresholds to be utilized by the inhibitory cascade component 118 for respective stages of the multi-stage detection process. The inhibitory cascade threshold setter component 510 can set such thresholds $\theta_k^I$ as follows, given H, $x_i$, and target QMR $\gamma$. The procedure is somewhat similar to the approach undertaken by the soft cascade threshold setter component 506 described above. First, the following can be defined: $R_k(x)=\min'_{x \in \mathcal{N}(x)}\{H_k(x)/H)k(x')\}$. Further, $y'=1-(1-\gamma)^{1/K}$, $X'_k$ denotes the set of surviving quasi-positives in stage k, and $\mathcal{H}_k=\{R_k(x_i)|x_i \in X'_k\}$. Thereafter, $\theta_k^I$ can be set through employment of the following algorithm:

$$\theta_k^I=\min\{1,\lfloor \mathcal{H}_k \rfloor_r/(1+\epsilon)\}, \text{ where } r=\lfloor\gamma'\cdot|\mathcal{H}_k|\rfloor. \quad (5)$$

$X'_1$ comprises all quasi-positives, and $X'_k=\{x_i \in X'_{k-1}|R_{k-1}(x_i)>\theta_{k-1}^I\}$. An inhibitory cascade with $\theta_k^I$ defined above has a QMR of at most $\gamma$.

Figure 6:
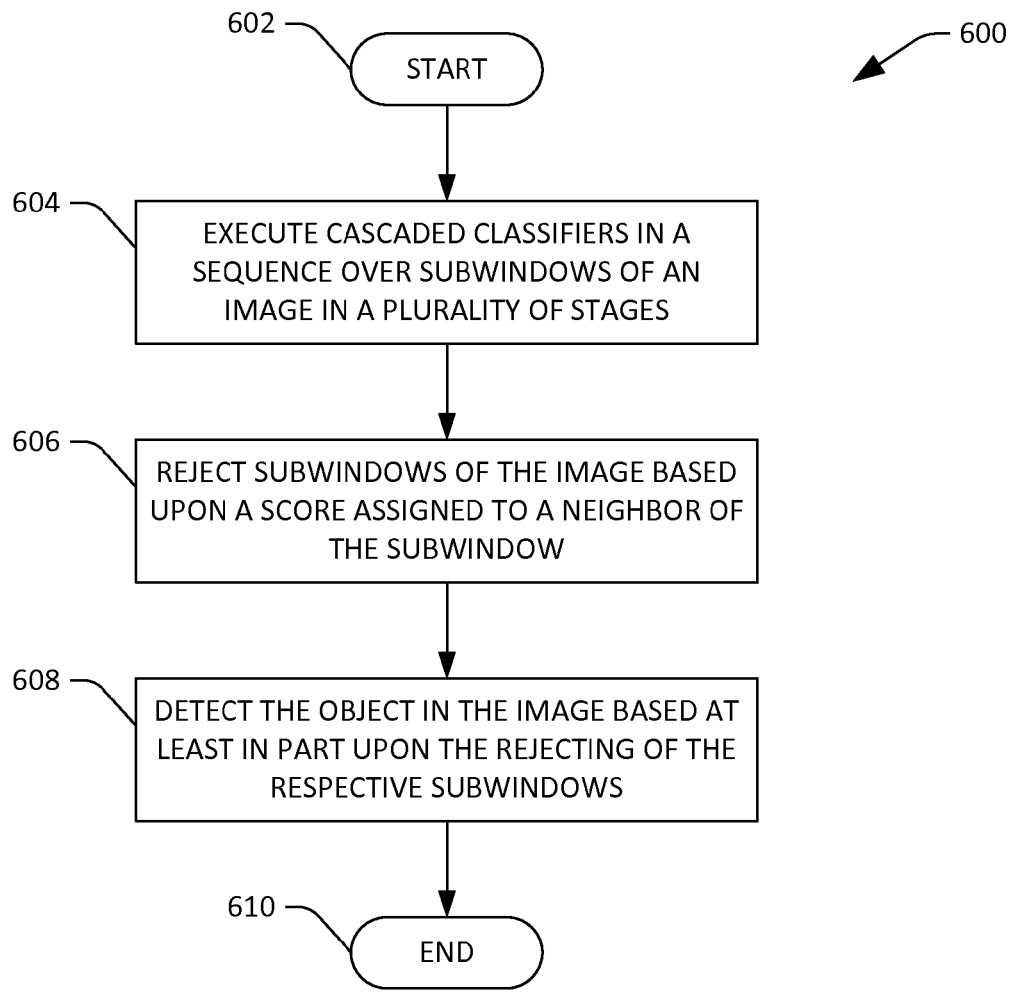
FIG. 6 is a flow diagram that illustrates an exemplary methodology for detecting an object in an image.
Figure 7:
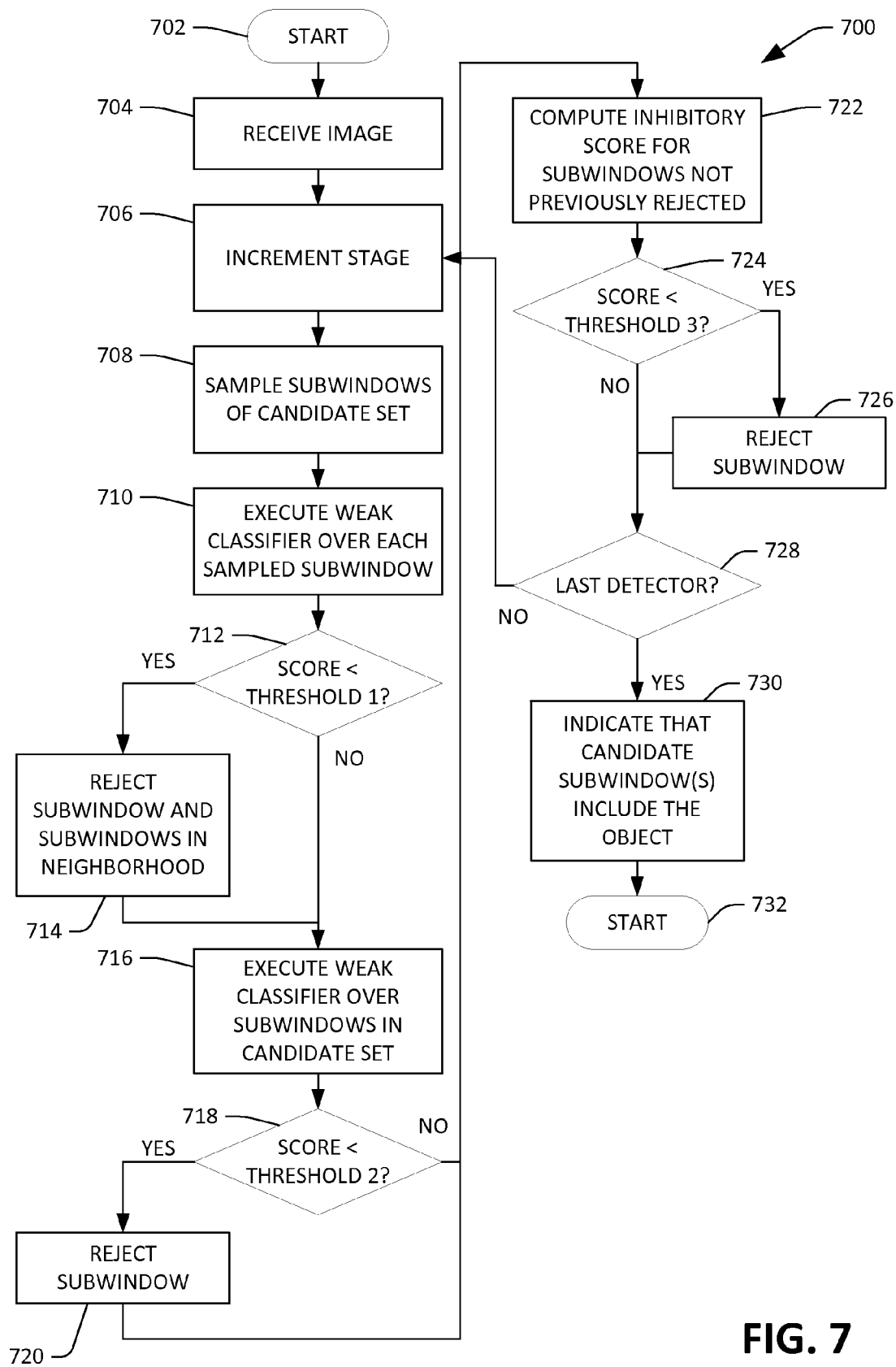
FIG. 7 is a flow diagram that illustrates an exemplary methodology for detecting an object in an image.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagating signal.

Turning now to FIG. 6, an exemplary methodology 600 that facilitates identifying an object in an image through utilization of a crosstalk cascade is illustrated. For instance, the methodology 600 can be configured for execution on a mobile computing device, such as a mobile telephone. The methodology 600 starts at 602, and at 604 a cascaded classifier is executed over a respective plurality of stages, wherein accuracy of output of the cascaded classifier increases as each weak classifier therein is executed over a subwindow of the image. At 606, a subwindow of the image is rejected based upon a score assigned to a neighbor of the subwindow by a classifier in the cascade of classifiers.

At 608, the object in the image is identified based at least in part upon the rejecting of the subwindow. For example, when all classifiers in the cascaded classifier have executed, the cascaded classifier can identify subwindows that include the object. The methodology 600 completes at 610.

Turning now to FIG. 7, an exemplary methodology 700 that facilitates detecting an object in an image is illustrated. The methodology 700 starts at 702, and at 704 an image is received. At 706, a stage in an object detection process is incremented. For instance, initially the stage can be incremented to one at 706.

At 708, subwindows of the image in a candidate set of subwindows (subwindows not previously rejected) are sampled. For instance, a sparse sampling of subwindows can be selected at 708. At 710, a weak classifier corresponding to the current stage is executed over each subwindow sampled at 708. Accordingly, each sampled subwindow is assigned a score by the weak classifier. For subsequent stages, the score output by a respective weak classifier for such stages is aggregated with previous scores generated by other weak classifiers. At 712, a determination is made regarding whether the score computed at 710 is less than an excitatory cascade threshold for the current stage. If it is determined that the score is less than this threshold, then at 714, the subwindow and subwindows in a predefined neighborhood of the subwindow are rejected. If the score greater than the aforementioned threshold, then the subwindow and subwindows in the neighborhood are retained in a candidate set.

Thereafter, at 716, the weak classifier corresponding to the current stage is executed over subwindows in the candidate set. Accordingly, each subwindow in the candidate set will have a respective score assigned thereto for the stage corresponding to the weak classifier.

At 718, for each subwindow, a determination is made regarding whether the score computed at 716 for a respective subwindow is less than a soft cascade threshold for such stage. If, for the respective subwindow, the score is less than such threshold, then at 720, the subwindow is rejected. Otherwise, the respective subwindow is retained in the candidate set.

The methodology 700 then continues to 722, where an inhibitory score is computed for each subwindow in the candidate set. As described above, such inhibitory score is indicative of a score for a subwindow relative to a score for a subwindow in its predefined neighborhood. At 724, for each subwindow in the candidate set, a determination is made regarding whether the inhibitory score for a respective subwindow is below an inhibitory cascade threshold. If the inhibitory score for the subwindow is less than such threshold, then at 726 the subwindow is rejected. Otherwise, the subwindow is retained as a candidate for including the object that is desirably detected.

Thereafter, at 728, a determination is made regarding whether the current stage is the final stage in the object detection process. If it is not the final stage, then the methodology 700 returns to 706, where the stage is incremented, and the methodology 700 proceeds as described above. If it is the last stage, then all candidate subwindows (subwindows not rejected) are indicated as including the object that is desirably detected at 730. The methodology 700 completes at 732.

Figure 8:
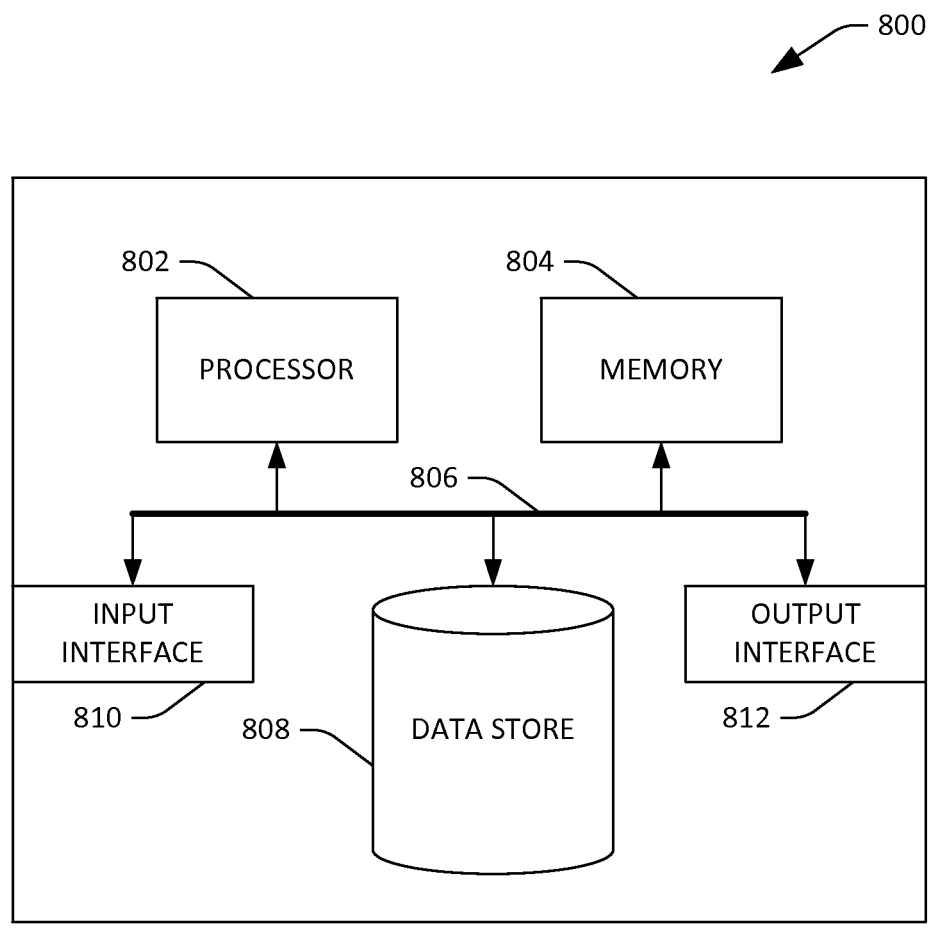
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports detecting objects in images. In another example, at least a portion of the computing device 800 may be used in a system that supports learning of thresholds to utilize with a crosstalk cascade. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store images, cascade thresholds, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, images, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method for detecting a specified object in an image, the method comprising:
    a) receiving the image;
    b) selecting a classifier from a cascade of classifiers, wherein the classifier is configured to analyze subwindows of the image and output scores that are indicative of likelihood of the object existing in respective subwindows;
    c) selecting, from candidate subwindows, a first set of subwindows, wherein a number of subwindows in the first set of subwindows is less than a number of subwindows in the candidate subwindows;
    d) for each subwindow in the first set of subwindows, executing the classifier over a respective subwindow such that the classifier outputs a respective score for the respective subwindow;
    e) for each subwindow in the first set of subwindows, comparing the respective score assigned to the respective subwindow with an excitatory cascade threshold value;
    f) for each subwindow in the first set of subwindows, when the score assigned to the respective subwindow in the first set of subwindows is below the excitatory cascade threshold value, removing the respective subwindow and any other subwindow in a defined neighborhood of the respective subwindow from the candidate set;
    g) subsequent to the removing of the respective subwindow and any other subwindows in the defined neighborhood of the respective subwindow, executing the classifier over a second set of subwindows, the second set of subwindows comprising subwindows in the candidate set except for any subwindows in the first set;
    h) for each subwindow in the candidate set, comparing the score assigned to the respective subwindow with a soft cascade threshold value;
    i) when the score assigned to the respective subwindow is below the soft cascade threshold value, removing the respective subwindow from the candidate set; and
    j) detecting the specified object in the image as being in at least one subwindow from the candidate set.

2. A method that facilitates detecting an object in an image, the method comprising:
    executing a cascaded classifier over subwindows of the image, the cascaded classifier comprising a sequence of weak classifiers that correspond to a respective sequence of stages, wherein accuracy of the cascaded classifier increases as the sequence of stages advances, and wherein at each stage in the sequence of stages a respective weak classifier outputs scores for respective subwindows of the image, wherein a score assigned to a subwindow is indicative of a probability that the respective subwindow includes the object;
    in multiple stages, rejecting at least one subwindow from the subwindows based upon a score assigned to a neighbor of the subwindow in the image by the cascaded classifier; and
    detecting the object in the image based at least in part upon the rejecting of the at least one subwindow.

3. The method of claim 2, wherein the rejecting of the at least one subwindow is based solely upon the score assigned to the neighbor of the subwindow.

4. The method of claim 2, wherein the rejecting of the at least one subwindow is based upon the score assigned to the neighbor of the subwindow and a score assigned to the at least one subwindow.

5. The method of claim 2 configured for execution on a mobile computing device.

6. The method of claim 2, wherein the mobile computing device is a mobile telephone, the method further comprising receiving the image from a camera of the mobile telephone.

7. The method of claim 2, wherein the object is a face of a human being.

8. The method of claim 2, wherein the object is a human being.

9. The method of claim 2, wherein the object is detected as being in the image in each subwindow of the image not rejected based upon output of the cascaded classifier at a last stage of the sequence of stages.

10. The method of claim 2, further comprising:
at each stage in the sequence of stages, and for each subwindow not rejected in a previous stage in the sequence of stages, computing multiple values that are based upon a score for a respective subwindow generated by a weak classifier for a respective stage;
comparing the multiple values with multiple respective threshold values; and
rejecting subwindows based upon the comparing of the multiple values with the multiple respective threshold values.

11. The method of claim 10, wherein a first threshold in the multiple respective thresholds is an excitatory cascade threshold, wherein a score generated by the cascaded classifier below the excitatory threshold for a subwindow indicates that the subwindow and subwindows in a predefined neighborhood of the subwindow are to be rejected.

12. The method of claim 11, wherein a second threshold in the multiple respective thresholds is a soft cascade threshold, wherein a score generated by the cascaded classifier below the soft cascade threshold for a subwindow indicates that the subwindow is to be rejected.

13. The method of claim 12, wherein a third threshold in the multiple respective thresholds is an inhibitory cascade threshold, the method further comprising:

computing an inhibitory score for the at least one subwindow, the inhibitory score being a ratio of the score for the at least one subwindow and a score for a neighboring subwindow; and
rejecting the at least one subwindow if the inhibitory score is below the inhibitory cascade threshold.

14. The method of claim 13, wherein a fourth threshold in the multiple thresholds is a crosstalk threshold, wherein the crosstalk threshold is based upon the excitatory threshold, the soft cascade threshold, and the inhibitory threshold.

15. A computing device that is programmed to detect an object in an image, the computing device comprising:
a processor; and
a memory that comprises instructions that are executable by the processor, the instructions comprising:
first instructions for forming a candidate set of subwindows in the image by rejecting at least a first subwindow based upon a score assigned to a second subwindow;
second instructions for removing a third subwindow from the candidate set based upon a score assigned to a fourth subwindow in the candidate set, the score assigned to the second subwindow and the score assigned to the fourth subwindow are generated by a cascaded classifier; and
third instructions for indicating that the object is in the image based upon the score assigned to the fourth subwindow.

16. The computing device of claim 15 being a mobile computing device.

17. The computing device of claim 16, wherein the object is a face.

18. The computing device of claim 16, wherein the object is a human being.

19. The computing device of claim 15, wherein the first instructions and the second instructions are repeated in multiple stages.

20. The system of claim 15, wherein the instructions further comprise fourth instructions for rejecting a fifth subwindow from the candidate set based solely upon a score assigned to the fifth subwindow by the cascaded classifier.

* * * * *